United States Patent [19]
Geiss

[11] 4,445,440
[45] May 1, 1984

[54] TRACK GUIDED VEHICLE

[75] Inventor: Sieghart Geiss, Remseck, Fed. Rep. of Germany

[73] Assignee: Daimler-Benz Aktiengesellschaft, Stuttgart, Fed. Rep. of Germany

[21] Appl. No.: 342,667

[22] Filed: Jan. 25, 1982

[30] Foreign Application Priority Data

Jan. 23, 1981 [DE] Fed. Rep. of Germany ....... 3102094

[51] Int. Cl.³ ........................... B61F 7/00; F01B 7/20; F01B 31/06
[52] U.S. Cl. ................................. 105/215 R; 105/141; 104/247; 104/118; 180/131; 92/52; 92/165 PR; 92/110
[58] Field of Search ............... 105/215 R, 215 C, 141, 105/144, 145, 177, 215 R, 215 C; 104/242, 243, 245, 246, 247, 118, 119, 120; 92/107, 117 R, 108, 117 A; 180/131

[56] References Cited

U.S. PATENT DOCUMENTS 2,163,982  6/1939  Mercier ................................. 92/107
2,967,512  1/1961  Born ..................................... 92/117 R
4,092,931  6/1978  Wulf et al. .......................... 104/242

FOREIGN PATENT DOCUMENTS 2636656  2/1978  Fed. Rep. of Germany .
2842768  4/1980  Fed. Rep. of Germany ...... 104/247
441979   11/1948 Italy ...................................... 92/107

Primary Examiner—David A. Scherbel
Assistant Examiner—Glenn Foster
Attorney, Agent, or Firm—Craig & Burns

[57] ABSTRACT

A track guided vehicle is provided which includes laterally projecting transverse guide rollers mounted on support arms extending in a direction parallel to a direction of travel of the vehicle. The guide rollers are adapted to be retractable and extendable to an operating position through a guide arrangement which is directed diagonally upwardly and inwardly with a bilaterally effective operating element being disposed concentrically within the guide arrangement. The transverse guide rollers are elastically flexible in a transverse direction and are adapted to utilize an on board compressed air system to displace the transverse guide rollers and fluidic operating or working element which is constructed for pneumatic pressure application. In order to be able to apply a sufficiently high transverse retaining force with a limited air pressure available from the on board compressed air system of the vehicle, thereby providing the largest possible effective piston area for the guide arrangement, an inner surface of the hollow guide column forms a cylinder of the operating or working element, with the cylinder being adapted to move relative to a fixed piston of the operating or working element.

2 Claims, 2 Drawing Figures

TRACK GUIDED VEHICLE

The present invention relates to a vehicle and, more particularly, to a track guided vehicle provided with at least one transverse guide roller on each lateral side of the vehicle, with the roller being adapted to be retractable and extendable to an operating position, in which operating position the roller extends laterally beyond the outside wall of the vehicle. The roller is mounted on a support arm and a guide means for extending and retracting the respective transverse guide rollers. The guide means is mounted at an end of a support arm and extends diagonally upwardly in a direction toward an interior of the vehicle. The guide may include a guide bushing secured to the support arm and directed parallel to a direction of guidance, with the support including a hollow guide column axially movably guided therein but prevented against rotation with respect to a bearing pin of the transverse guide roller. Fluidic bilaterally effective operating means are disposed inside the guide column and function as a drive means for enabling a retraction and/or extension movement of the transverse guide rollers.

In, for example, Offenlegungsschrift No. 2,636,656, a track guidance arrangement of the aforementioned type is provided wherein a separate working element, of a relatively small diameter, is provided, with the working element including a piston and cylinder disposed inside the guide column, and with the working element being adapted to be exposed to very high pressures in order to apply required transverse retaining forces.

A disadvantage of the above proposed construction resides in the fact that the required high pressures cannot be applied by an on board compress-air supply system of the vehicle since such on board systems have, for various reasons, limited pressures. To overcome this disadvantage a separate hydraulic system may be provided for ensuring a supply of a sufficiently high pressure; however, the provision of such a separate hydraulic system must be mounted on board of the vehicle thereby increasing not only the overall weight of the vehicle but also utilizing space which might otherwise be used for a payload.

Yet another disadvantage of utilizing a separate hydraulic displacement system for the transverse guide roller resides in the fact that not only the hydraulic system must be installed and transported aboard the vehicle but additionally it is necessary to install and transport the required compressed air supply system for the vehicle thereby increasing the manufacturing and operating costs of the vehicle.

A still further disadvantage of the above proposed track guidance means resides in the fact that, due to the incompressibility of the working medium, a hydraulically tensioned working element rigidly holds or maintains the transverse guide roller in place, so that transverse impacts are fully transmitted to the vehicle through the support arm of the track guidance means. As can readily be appreciated, undamped unsprung transmission of transverse impacts to the support arm and to the vehicle not only adversely affect transverse riding comfort and transverse guide noise, but also neces sitate making the support arm so sturdy and heavy that it will be ensured that the support arm will be capable of accepting peak loads resulting from the corresponding transverse impacts. However, the constructing of a support arm, generally connected to unsprung masses of the vehicle, so as to be especially sturdy and/or heavy, not only increases the weight of the vehicle and, consequently, the fuel consumption, but also adversely affects the springing or riding comfort of the vehicle.

The aim underlying the present invention essentially resides in providing a track guided vehicle of the aforementioned type which has a significantly improved overall riding comfort.

In accordance with advantageous features of the present invention, a working element is provided which is constructed for pneumatic pressurization with an interior of the guide column, having a round cross sectional configuration, directly assuming a function of a cylinder of the working element by virtue of suitable surface machining. The guide column is sealed at an upper end thereof opposite the transverse guide roller by a removable cover, with a central opening provided in the cover sealingly accommodating a piston rod. The piston of the working element is disposed interiorly of the guide column and is axially fixed by an upper end of a guide bushing through the piston rod. The piston is adapted to come to rest against the cylinder when the guide column is retracted to the lowest relative position.

By virtue of the above noted feaures of the present invention, and, in particular, the provision of a working element constructed for pneumatic pressurization, it is possible to use the normally required on board compressedair supply system of the vehicle so that a separate hydraulic pressure source for moving the transverse guide rollers back and forth is eliminated. Moreover, the compressibility of the air used means that the transverse guide roller is held elastically and flexibly in the transverse position and, consequently, the guide roller may flex slightly when it encounters transverse impacts.

By virtue of the ability of the construction to flex slightly, it is possible for the vehicle of the present invention to smooth out peaks in the forces acting on the support arm thereby permitting the support arm to be constructed less sturdy or heavy.

Additionally, by simultaneously employing the inner surface of the guide column as a cylinder, the effective piston area of the working element can be made sufficiently large so that high transverse retaining forces may be applied despite the limitation of the maximum applicable working pressures.

In accordance with still further features of the present invention, the piston rod is advantageously constructed so as to be hollow and a pressure supply to the working chamber located above the piston and a pressure supply to the working chamber located below the piston are provided by two channels or the like disposed or formed inside the piston rod.

Advantageously, in accordance with still further features of the present invention, an inside diameter of the cylinder of the working element is approximately one-third to one-half of a diameter of the transverse guide roller.

Accordingly, it is an object of the present invention to provide a track guided vehicle which avoids, by simple means, shortcomings and disadvantages encountered in the prior art.

Another object of the present invention resides in providing a track guided vehicle having an overall reduced weight thereby improving the fuel consumption.

Yet another object of the present invention resides in providing a track guided vehicle which dispenses with the need for providing separate drive elements for the track guidance means of the vehicle.

A still further object of the present invention resides in providing a track guided vehicle which minimizes if not avoids the transmission of transverse impacts to the vehicle.

A still further object of the present invention resides in providing a track guided vehicle which is simple in construction and therefore relatively inexpensive to manufacture.

These and other objects, features, and advantages of the present invention will become more apparent from the following description when taken in connection with the accompanying drawing which shows, for the purpose of illustration only, one embodiment in accordance with the present invention, and wherein.

Figure 1:
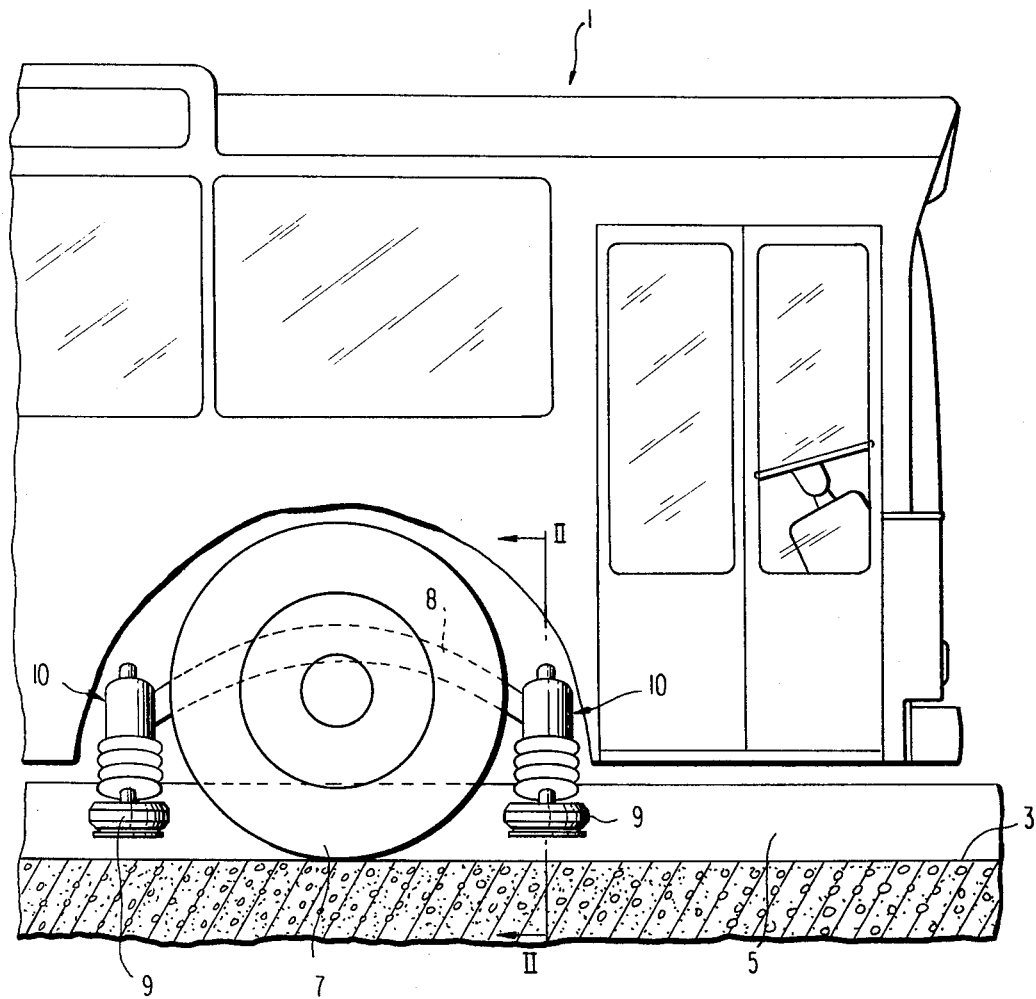
FIG. 1 is a partial cut-away side elevational view of a track guided vehicle constructed in accordance with the present invention provided with retractable transverse guide rollers.

Referring now to the drawings wherein like reference numerals are used in both views to designate like parts and, more particularly, to FIG. 1, according to this figure, a vehicle generally designated by the reference numeral 1 which may, for example, be a passenger bus adapted, for example, for operation in a guideway 3 of a track guided system or on a open highway, includes transverse guide rollers 9 mounted on ends of a support arm 8 forwardly and rearwardly of the vehicle wheel 7, as viewed in a normal driving direction of the vehicle 1. The transverse guide rollers are disposed on respective lateral sides of the vehicle 1 and cooperate with transverse spaced guide rails 5 of the guideway 3. The support arms 8 and transverse guide rollers 9 participate, in a conventional manner, in steering movements of the steerable vehicle 1. Thus, the direction of the transverse guide rail 5 is transmitted to the vehicle wheel 7 through the transverse guide rollers 9 and support arms 8, thereby keeping the vehicle 1 on the guideway 3.

Figure 2:
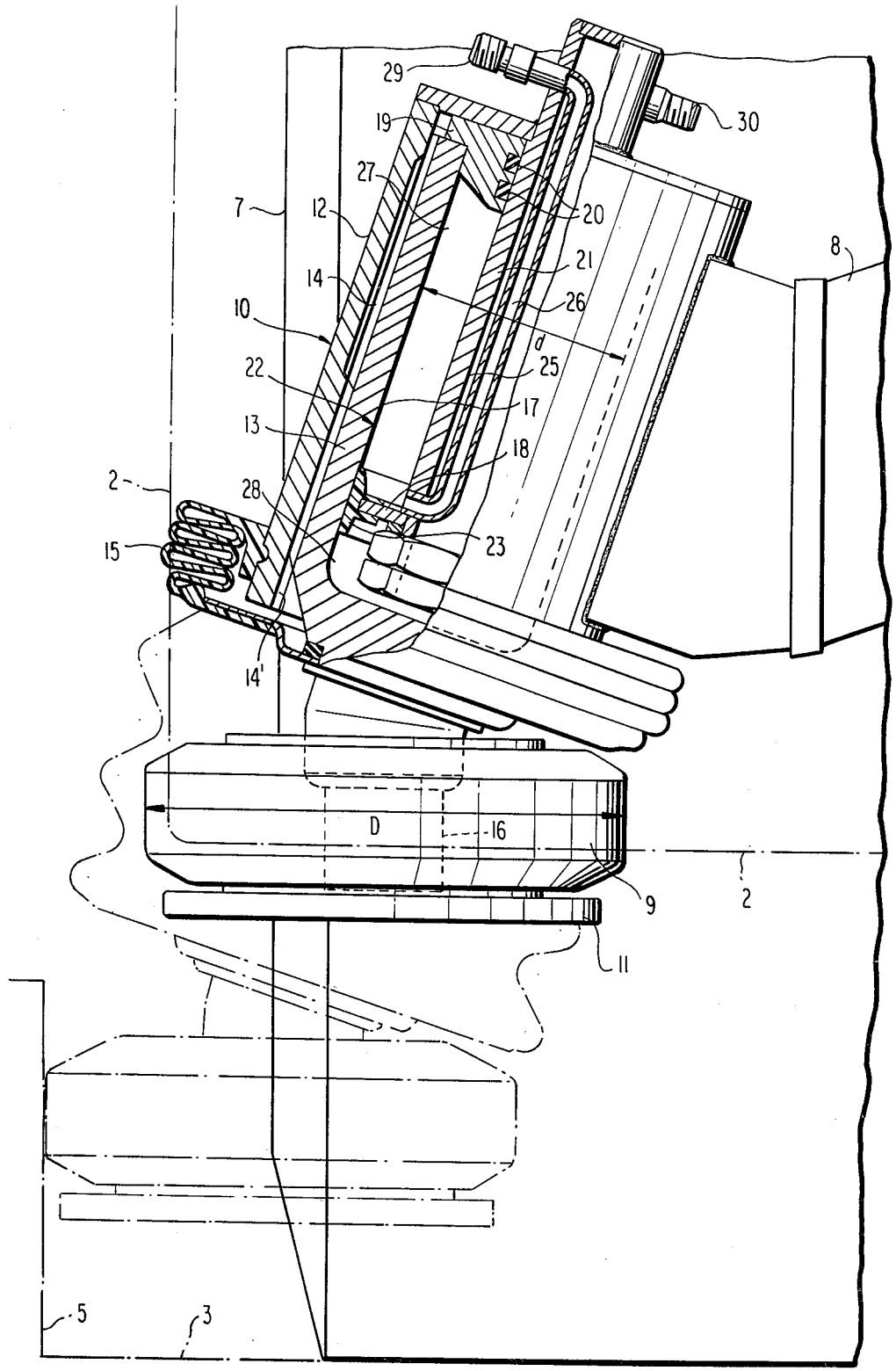
FIG. 2 is a cross sectional view, on an enlarged scale, of a mounting for a transverse guide roller taken along the line II-II in FIG. 1.

A guide means generally designated by the reference numeral 10 is provided at each end of the support arm 8 for each of the transverse guide rollers 9, with the guide means being directed or extending diagonally upwardly in a direction toward an interior of the vehicle 1. The guide means 10 permits the transverse guide rollers 9 to be selectively retracted from the extended lowered operating position of FIG. 1 in which the transverse guide rollers 9 extend beyond an outside wall 2 of the vehicle 1 into the raised retracted position illustrated in solid lines in FIG. 2 and vice versa. An emergency wheel 11, constructed of, for example, steel is disposed below the respective transverse guide rollers 9. The emergency wheel is capable of bearing a portion of the load when extremely high transverse stresses are imposed on the respective transverse guide rollers 9. The emergency wheel 11 has an outer circumferential surface formed of a solid rubber.

The guide means for retracting and extending the transverse guide roller 9 each include a guide bushing 12 connected with the support arm 8 and a guide column 13 mounted in the guide bushing 12 for axial but non-rotatable movement. The guide column 13 is fixedly permanently linked or connected to a bearing pin 16 of the respective transverse guide rollers 9. The bearing pin 16 is arranged at an angle with respect to a longitudinal center axis of the guide column 13 by virtue of the diagonal positioning of the guide means 10 thereby ensuring that the transverse guide roller 9 will be horizontally disposed on the bearing pin 16.

Radially extending grooves 14, 14' are provided for preventing the guide column 13 from rotating or turning in the guide bushing 12 with the radial grooves forming a flat surface on an outer circumference of the guide column 13 and on an inside of the guide bushing 12. A corrugated boot or bellows 15 is mounted on an underside of the guide bushing 12 and/or the guide column 13 in order to protect the guide surfaces against contamination.

The guide bushing 12 and/or guide column 13 have a length which is sufficient to enable an execution of a long retracting movement so as to enable the transverse guide rollers 9 to be raised into a vicinity of a lower edge of the outside wall 2 of the vehicle.

The guide column 13 is hollow, with a working element generally designated by the reference numeral 22 being accommodated in the hollow interior of the guide column 13. The working element 22, formed of a cylinder 17 and a piston 18 is disposed concentrically inside of the guide column 13 and forms a drive means for enabling the selective extension and retraction movements of the transverse guide rollers 9. By an appropriate machining of an inside surface of the guide column 13, the inner surface forms the cylinder 17 of the working element 22. By virtue of this arrangment, it is possible to install a piston having as large as possible an effective piston area while nevertheless saving space. In this manner, an inside diameter d of the cylinder 17 may easily be reached which corresponds to approximately one-third to one-half of a diameter D of the respective transverse guide rollers 9 without the guide means 10 having to have a diameter which is unnecessarily large. A diameter of the guide surfaces of the guide means 10 must also have a favorable ratio to a guide length of the guide surfaces in order to realiably prevent a tilting of the guide means. For this reason, an increase in diameter would also necessarily result in an increase in an axial dimensioning of the guide means 10. For this reason, a radial spacesaving construction with a sufficiently large piston area become particularly important.

Since, as noted above, the axially movable guide column 13 simultaneously forms a cylinder 17, i.e., the movable part of the working element 22, the piston 18 which cooperates with the cylinder 17 is disposed in a fixed position by a fixed piston rod 21. The piston rod 21 is secured to an upper end of the guide bushing 12 by a retaining cover 24, with the piston rod 21 extending through a central opening provided in a cover 19. Appropriate seals 20 are provided for sealing the piston rod 21 in the central opening of the cover 19. The cover 19 is, in turn, mounted against an upper end of the guide column 13 which faces away from the transverse guide roller 9 so that it is possible by the piston 18 and piston seal 23 to divide an interior of the cylinder 17 into a lower overall working chamber 28, subjected to pressure in a lower operating position of the transverse guide roller 9, and an upper annular working chamber 27 exposed to a pressure in a retracted position of the transverse guide roller 9. Pressure is supplied to the working chambers 27, 28 through an interior of the hollow piston rod 27. The working pressure for the lower working chamber 28 is supplied through a supply connection 30 and a large bore 25 disposed concentrically with respect to a longitudinal center axis of the piston rod 21. The bore 25 is dimensioned so as to accept a supply tube 26 therein, with the supply tube 26 extending, with an appropriate sealing, from a supply connection 29 to the upper working chamber 27.

When the lower overall and larger working chamber 28 is pressurized, the guide column 13 is lowered until the sealing cover 19 strikes or comes into abutment with a top of the piston 18. The large effective piston area of the piston 18 permits the transverse guide roller 9 to be held in the lowered operating position at a high transverse retaining force but in such a manner that it is elastically flexible in a transverse direction.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A track guided vehicle comprising
at least one transverse guide roller means provided on respective lateral sides of the vehicle,
guiding means for mounting each of the transverse guide roller means for movement to and from a retracted position to an extended operating position laterally beyond an outside wall of the vehicle,
said guiding means including a first guide member and a hollow guide column axially displaceably and non-rotatably mounted in the first guide member and being connected by a bearing pin means to the transverse guide means associated therewith,
a bilaterally effective pneumatically operated cylinder and a piston accommodated in the cylinder accommodated in said hollow guide column for selectively displacing the respective transverse guide roller means between the respective positions,
a support arm means being provided for mounting the respective guiding means at the vehicle,
said guiding means being mounted at an end of said support arm means so as to extend diagonally upwardly and in a direction towards an interior of the vehicle,
the first guide member being a guide bushing secured at the support arm means,
the cylinder being formed by a machined interior surface of the hollow guide column,
the interior of the hollow guide column having a round cross-sectional configuration,
removable cover means being provided for sealing an end of the hollow guide column opposite the transverse guide roller means,
the piston resting against a portion of said cylinder when the guide column is retracted to a lowest relative position,
the piston dividing the cylinder into an upper working chamber and a lower working chamber, said piston includes a hollow piston rod,
means being provided in the hollow rod for communicating the respective chambers with a pressure supply,
said means for communicating including individual channel means provided in the hollow rod,
the cylinder having an inside diameter generally between one-third to one-half of an outer diameter of the transverse guide roller means,
a further cover member being mounted on an upper end of the first guide member,
means being provided for axially fixing the piston with respect to the first guide member,
said means for axially fixing including the piston rod connected to the piston and extending through a central opening in the removable cover means,
seal means being provided for sealing the central opening in the removal cover means, whereby upon pressurization of said working chambers with respect to each other, the guide column is axially displaced with respect to the first guide member so as to enable selective displacement between the respective positions.

2. A track guided vehicle according to claim 1, further comprising the vehicle including steerable wheels, and a transverse guide roller means being disposed forwardly and rearwardly, as viewed in a normal driving direction of the vehicle, of each of the steerable wheels.

* * * * *